United States Patent
Watanabe et al.

(10) Patent No.: US 9,082,065 B2
(45) Date of Patent: Jul. 14, 2015

(54) IMAGE EDITING DEVICE, IMAGE EDITING METHOD, PROGRAM, AND COMPUTER READABLE STORAGE MEDIUM

(75) Inventors: Yoshiaki Watanabe, Shinagawa-ku (JP); Bhupendra Singh, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/342,923

(22) PCT Filed: Jun. 28, 2012

(86) PCT No.: PCT/JP2012/066613
§ 371 (c)(1),
(2), (4) Date: Mar. 5, 2014

(87) PCT Pub. No.: WO2013/046837
PCT Pub. Date: Apr. 4, 2013

(65) Prior Publication Data
US 2014/0218768 A1 Aug. 7, 2014

(30) Foreign Application Priority Data
Sep. 27, 2011 (JP) .................................. 2011-211675

(51) Int. Cl.
| G06K 15/00 | (2006.01) |
| G06F 15/00 | (2006.01) |
| G06K 1/00 | (2006.01) |
| G06F 3/048 | (2013.01) |
| G06K 15/02 | (2006.01) |
| H04N 1/387 | (2006.01) |
| G06T 11/60 | (2006.01) |

(52) U.S. Cl.
CPC ............ *G06K 15/1868* (2013.01); *G06T 11/60* (2013.01); *H04N 1/387* (2013.01)

(58) Field of Classification Search
CPC .......................... H04N 1/00196; H04N 1/387
See application file for complete search history.

(56) References Cited

U.S. PATENT DOCUMENTS

| 2003/0072486 A1* | 4/2003 | Loui et al. ............... 382/175 |
| 2007/0268271 A1* | 11/2007 | Kinjo ..................... 345/173 |
| 2010/0215279 A1* | 8/2010 | Gao et al. ............... 382/224 |

FOREIGN PATENT DOCUMENTS

JP 2000-222381 A 8/2000

OTHER PUBLICATIONS

International Search Report dated Sep. 25, 2012 in PCT/JP2012/066613.

* cited by examiner

*Primary Examiner* — Thomas Lett
(74) *Attorney, Agent, or Firm* — Sughrue Mion, PLLC

(57) ABSTRACT

Provided is an image editing device that enables a user to easily assign images to a plurality of pages of an album or the like so as to satisfy editorial restrictions. The image editing device acquires a plurality of pieces of image data; determines, based on respective photographed times of the plurality of pieces of image data and a reference time interval, details of an assignment of the plurality of pieces of image data to each of the plurality of pages so that an interval between photographed times of pieces of image data to be assigned to the each of the plurality of pages is the reference time interval or smaller; and outputs image output data on the each of the plurality of pages based on a result of the assignment.

7 Claims, 10 Drawing Sheets

FIG.11 page1 page2 page3 page4 page5 page6

IMAGE EDITING DEVICE, IMAGE EDITING METHOD, PROGRAM, AND COMPUTER READABLE STORAGE MEDIUM

CROSS REFERENCE TO RELATED APPLICATIONS

This application is a National Stage of International Application No. PCT/JP2012/066613, filed on Jun. 28, 2012, which claims priority from Japanese Patent Application No. 2011-211675, filed on Sep. 27, 2011, the contents of all of which are incorporated herein by reference in their entirety.

TECHNICAL FIELD

The present invention relates to an image editing device, an image editing method, a program, and a computer readable storage medium.

BACKGROUND ART

In recent years, it has become easier to acquire a large amount of image data such as photographs because of the widespread use of a digital camera. Meanwhile, it is cumbersome to manually classify those pieces of image data into groups for viewing, for example. Therefore, there has been developed a technology for classifying pieces of image data into a plurality of groups by using a computer as in a technology for classifying a plurality of images into groups based on whether or not an interval between photographed times of the images is a threshold value or larger, which is disclosed in Patent Literature 1.

CITATION LIST

Patent Literature

[Patent Literature 1] JP 2000-222381 A

SUMMARY OF INVENTION

Technical Problem

In recent years, it has become more common to electronically edit a layout of an album (also referred to as photo book) including a plurality of pages with the user's own hands. In a compilation obtained by assigning images to each of a plurality of pages such as an album, it is often the case that the images are edited so that the images that are assigned to each page are highly relevant to one another. Further, there are various editorial restrictions in creating the compilation such as an album. For example, when a large number of images are assigned to one page, it is difficult to see each of the images, and when there are a large number of pages, a cost for printing and binding increases.

When electronically editing the images, the user has been required to perform work of assigning the images one by one to each page in consideration of such editorial restrictions.

The present invention has been made in view of the above-mentioned problem, and has an object to provide an image editing device that enables a user to easily assign images to a plurality of pages constituting a compilation such as an album so as to satisfy editorial restrictions.

Solution to Problem

In order to solve the above-mentioned problem, according to the present invention, there is provided an image editing device, including: image data acquisition means for acquiring a plurality of pieces of image data; page assignment means for determining, based on respective photographed times of the plurality of pieces of image data and a given reference time interval, details of an assignment of the plurality of pieces of image data to each of a plurality of pages constituting a compilation so that an interval between photographed times of pieces of image data to be assigned to the each of the plurality of pages is the given reference time interval or smaller; and page image output means for outputting image output data on the each of the plurality of pages based on the determined details of the assignment, in which the page assignment means changes the given reference time interval, to thereby determine the assignment that satisfies at least one of a condition for a maximum number of pieces of image data to be assigned to the each of the plurality of pages and a condition for a number of pages of the plurality of pages.

Further, according to the present invention, there is provided a program for causing a computer to function as: image data acquisition means for acquiring a plurality of pieces of image data; page assignment means for determining, based on respective photographed times of the plurality of pieces of image data and a given reference time interval, details of an assignment of the plurality of pieces of image data to each of a plurality of pages constituting a compilation so that an interval between photographed times of pieces of image data to be assigned to the each of the plurality of pages is the given reference time interval or smaller; and page image output means for outputting image output data on the each of the plurality of pages based on the determined details of the assignment, in which the page assignment means changes the given reference time interval, to thereby determine the assignment that satisfies at least one of a condition for a maximum number of pieces of image data to be assigned to the each of the plurality of pages and a condition for a number of pages of the plurality of pages.

Further, according to the present invention, there is provided an image editing method, including: an image data acquisition step of acquiring a plurality of pieces of image data; a page assignment step of determining, based on respective photographed times of the plurality of pieces of image data and a given reference time interval, details of an assignment of the plurality of pieces of image data to each of a plurality of pages constituting a compilation so that an interval between photographed times of pieces of image data to be assigned to the each of the plurality of pages is the given reference time interval or smaller; and a page image output step of outputting image output data on the each of the plurality of pages based on the determined details of the assignment, in which the page assignment step includes changing the given reference time interval, to thereby determine the assignment that satisfies at least one of a condition for a maximum number of pieces of image data to be assigned to the each of the plurality of pages and a condition for a number of pages of the plurality of pages.

Further, according to the present invention, there is provided a computer readable storage medium having recorded thereon a program for causing a computer to function as: image data acquisition means for acquiring a plurality of pieces of image data; page assignment means for determining, based on respective photographed times of the plurality of pieces of image data and a given reference time interval, details of an assignment of the plurality of pieces of image data to each of a plurality of pages constituting a compilation so that an interval between photographed times of pieces of image data to be assigned to the each of the plurality of pages is the given reference time interval or smaller; and page image output means for outputting image output data on the each of the plurality of pages based on the determined details of the assignment, in which the page assignment means changes the given reference time interval, to thereby determine the assignment that satisfies at least one of a condition for a maximum number of pieces of image data to be assigned to the each of the plurality of pages and a condition for a number of pages of the plurality of pages.

According to the present invention, it is possible to enable the user to easily assign images to a plurality of pages constituting a compilation such as an album so as to satisfy editorial restrictions.

In an aspect of the present invention, the page assignment means may change the given reference time interval, to thereby determine the assignment that satisfies the condition for the maximum number of pieces of image data to be assigned to the each of the plurality of pages and the condition for the number of pages of the plurality of pages.

In an aspect of the present invention, the image editing device of the present invention may further include image data count calculation means for calculating a minimum value of a sum of numbers of pieces of image data of respective pages constituting, of possible combinations of numbers of images to be assigned to pages whose number corresponds to the condition for the number of pages, a combination that satisfies conditions that a number of pieces of image data to be assigned to each of the pages is the maximum number of pieces of image data to be assigned to the each of the plurality of pages or smaller and that a sum of numbers of pieces of image data to be assigned to adjacent pages is larger than the maximum number, and the image data acquisition means may acquire pieces of image data whose number corresponds to the calculated minimum value.

In an aspect of the present invention, the image data count calculation means may calculate $(Im+1) \times P/2$ as the minimum value of the sum of the numbers of pieces of image data of the respective pages, where Im represents the maximum number of pieces of image data to be assigned to the each of the plurality of pages and P represents the number of pages of the plurality of pages.

In an aspect of the present invention, the page assignment means may include: a reference time interval determination section for determining a new given reference time interval; temporary assignment means for assigning, based on the determined new given reference time interval and the photographed times of the plurality of pieces of image data, the plurality of pieces of image data to the each of the plurality of pages so that the interval between the photographed times of the pieces of image data to be assigned to the each of the plurality of pages is the new given reference time interval or smaller and that a number of pieces of image data to be assigned to the each of the plurality of pages is a number that corresponds to the condition for the maximum number or smaller; and assignment condition determining means for determining, when a number of pages obtained by the assignment that is performed by the temporary assignment means satisfies the condition for the number of pages, the assignment of the plurality of pieces of image data to the each of the plurality of pages that is performed by the temporary assignment means as the assignment of the plurality of pieces of image data to the each of the plurality of pages.

DESCRIPTION OF EMBODIMENTS

Now, embodiments of the present invention are described with reference to the accompanying drawings. Components having the same function among components to be described below are denoted by the same reference characters, and descriptions thereof are omitted. In the following description, a photo book editing system is taken as an example of a system including an image editing device (image editing server) for outputting image output data indicating an image of a page.

[First Embodiment]

Figure 1:
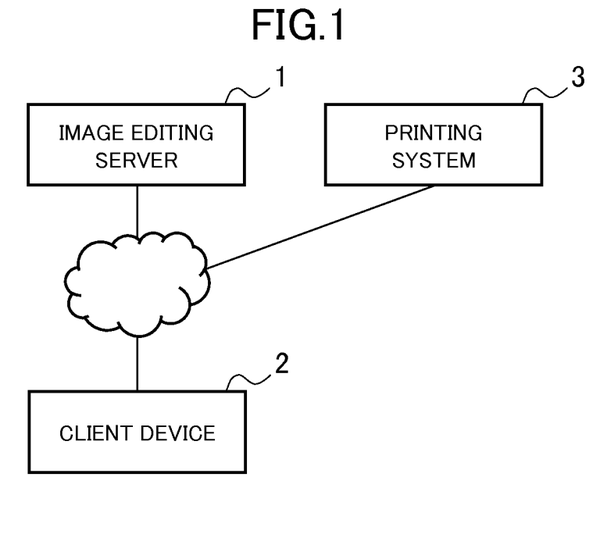
FIG. 1 A diagram illustrating an example of a configuration of a photo book editing system according to a first embodiment.

FIG. 1 is a diagram illustrating an example of a configuration of a photo book editing system according to a first embodiment of the present invention. The photo book editing system includes an image editing server 1 and a client device 2. The image editing server 1 is, for example, server hardware on which a web server program runs, and the client device 2 is, for example, a personal computer on which a program of a web browser runs. The image editing server 1 and the client device 2 communicate with each other via a network such as the Internet. Further, the image editing server 1 outputs image output data indicating a page image of each page of a photo book to a printing system 3 via the network.

A description is now given of an outline of an operation performed when the photo book editing system is used to edit a photo book. First, the image editing server 1 uses a web page displayed on the client device 2 and an input from a user performed through the page to acquire image data on an image to be assigned to a page and information as conditions for an assignment to the page. Next, the image editing server 1 presents the photo book obtained by assigning the image data to each page of the photo book to the user via the client device 2. If necessary, the user corrects the arrangement and assignment of images that are presented by using the image editing server 1. Then, the image editing server 1 outputs the image output data on those pages to the printing system 3. The printing system 3 prints the photo book and sends the printed photo book to the user who operates the client device 2 or other such person.

Figure 2:
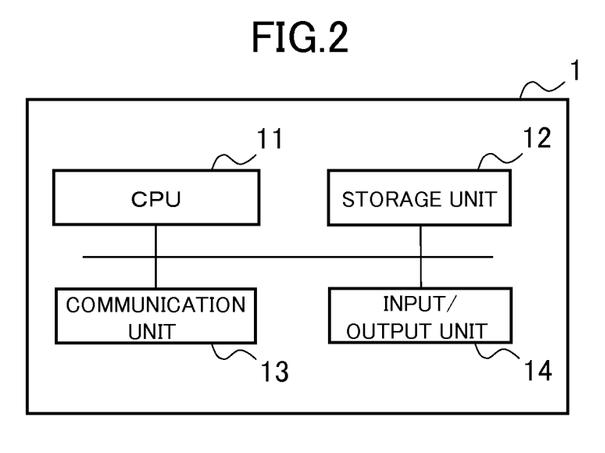
FIG. 2 A diagram illustrating an example of a configuration of an image editing server.

FIG. 2 is a diagram illustrating an example of a configuration of the image editing server 1 according to the first embodiment. The image editing server 1 includes a CPU 11, a storage unit 12, a communication unit 13, and an input/output unit 14.

The CPU 11 operates in accordance with a program stored in the storage unit 12. Further, the CPU 11 controls the communication unit 13 and the input/output unit 14. Note that, the program may be provided via the network such as the Internet, or may be provided by being stored in a computer-readable information recording medium such as a DVD-ROM and a USB memory.

The storage unit 12 includes a memory element such as a RAM and a ROM, and a hard disk drive. The storage unit 12 stores the above-mentioned program. The storage unit 12 also stores pieces of information input from respective components and calculation results.

As in a network card, the communication unit 13 includes communication means and the like for establishing communication connection to other devices including the client device 2 and the printing system 3. Under the control of the CPU 11, the communication unit 13 inputs information received from the other devices to the CPU 11 and the storage unit 12, and transmits information to the other devices.

The input/output unit 14 includes means for controlling a display output device such as a monitor and means for controlling an input device such as a mouse. Under the control of the CPU 11, the input/output unit 14 outputs the image data and the like to the display output device, and acquires information input from the input device.

Figure 3:
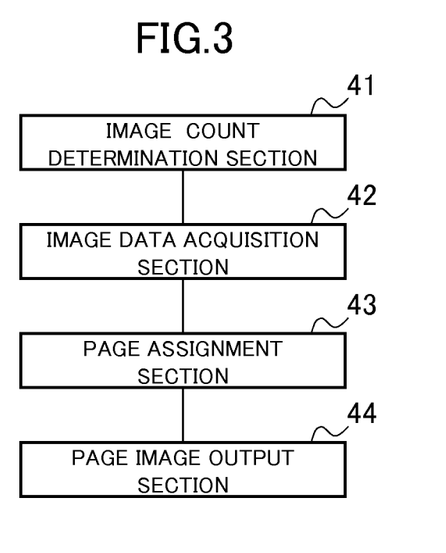
FIG. 3 A functional block diagram illustrating functions implemented by the image editing server according to the first embodiment.

FIG. 3 is a functional block diagram illustrating functions implemented by the image editing server 1 according to the first embodiment. The image editing server 1 functionally includes a image count determination section 41, an image data acquisition section 42, a page assignment section 43, and a page image output section 44. Those functions are implemented by the CPU 11 executing the program stored in the storage unit 12 to control the communication unit 13 and the input/output unit 14.

Figure 4:
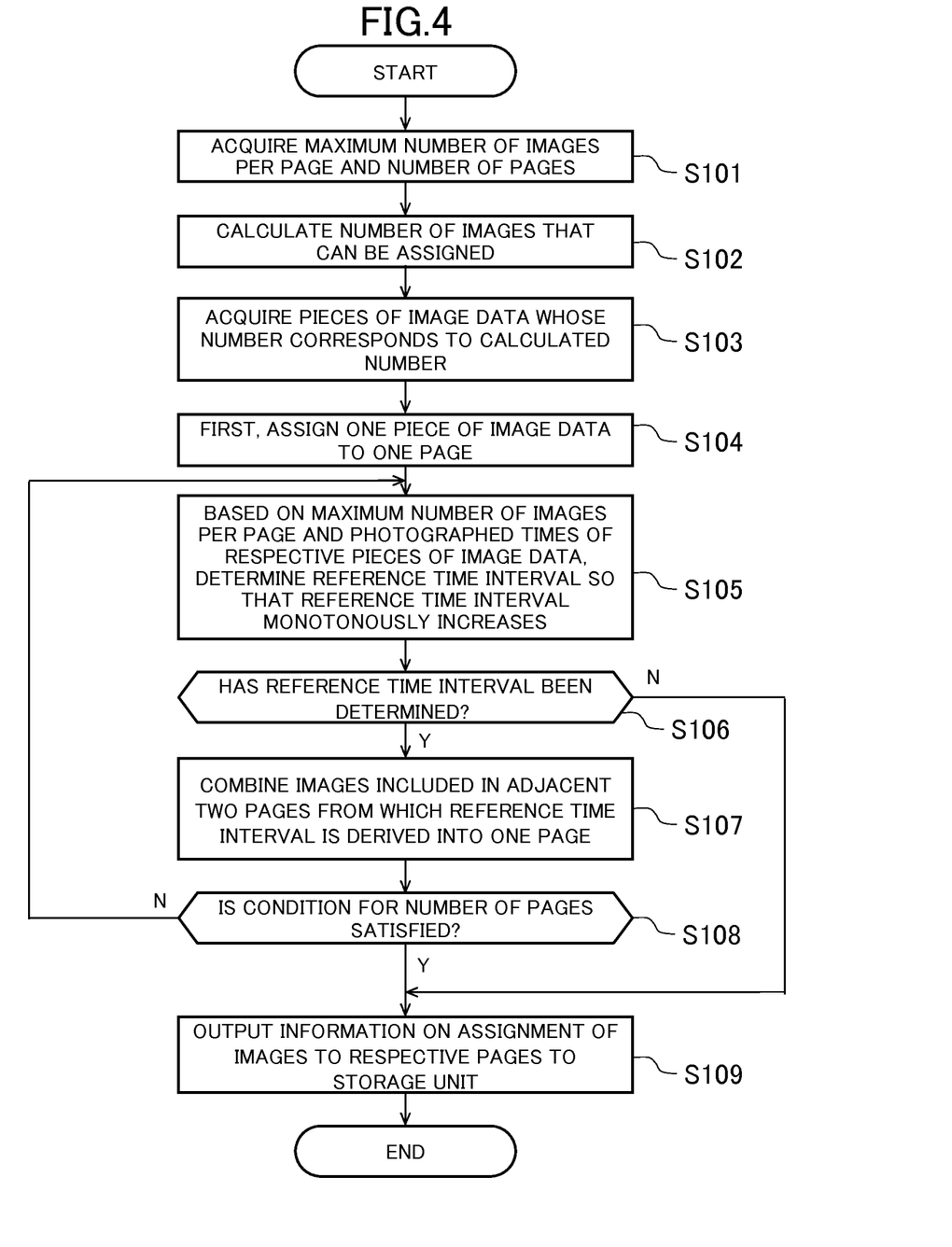
FIG. 4 A diagram illustrating an example of a processing flow of a image count determination section, an image data acquisition section, and a page assignment section according to the first embodiment.

The functions of the image count determination section 41, the image data acquisition section 42, and the page assignment section 43 are described below with reference to a processing flow. FIG. 4 is a diagram illustrating an example of the processing flow of the image count determination section 41, the image data acquisition section 42, and the page assignment section 43 according to the first embodiment.

The image count determination section 41 is implemented mainly by the CPU 11, the storage unit 12, and the communication unit 13. Based on conditions for the number of pages of the photo book and for the maximum number of images to be assigned to each page of the photo book, the image count determination section 41 calculates the number of pieces of image data that can be assigned by the page assignment section 43 to each of a plurality of pages constituting the photo book. Note that, one piece of image data is data indicating one image such as a photograph, and the maximum number of images to be assigned to each page is equivalent to the maximum number of pieces of image data to be assigned to each page. In the example to be described below, the maximum number of images to be assigned is the same for each page, and is referred to as maximum number of images per page. Processing of the image count determination section 41 is described below in more detail.

Figure 5:
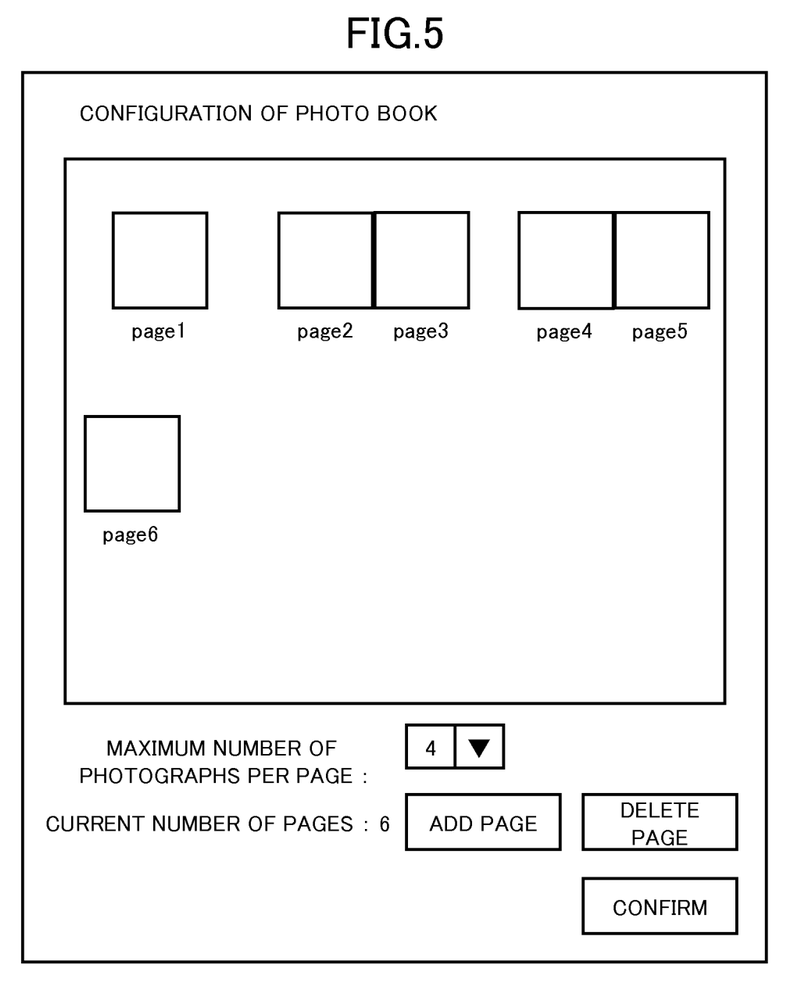
FIG. 5 A diagram illustrating an example of a screen for selecting the maximum number of images per page and the number of pages.

The image count determination section 41 first acquires the maximum number of images per page and the number of pages from the client device 2 via the communication unit 13 (Step S101). FIG. 5 is a diagram illustrating an example of a screen for selecting the maximum number of images per page and the number of pages. In the example illustrated in FIG. 5, the image count determination section 41 acquires the number of pages and the maximum number of images per page in an interactive manner. The user who operates the client device 2 depresses an "add page" button or a "delete page" button to increase or decrease the number of pages, and the user selects a pull-down menu to input the maximum number of images per page. When the user then depresses a "confirm" button, the image count determination section 41 acquires information on conditions for the input maximum number of images per page and number of pages.

Figure 6:
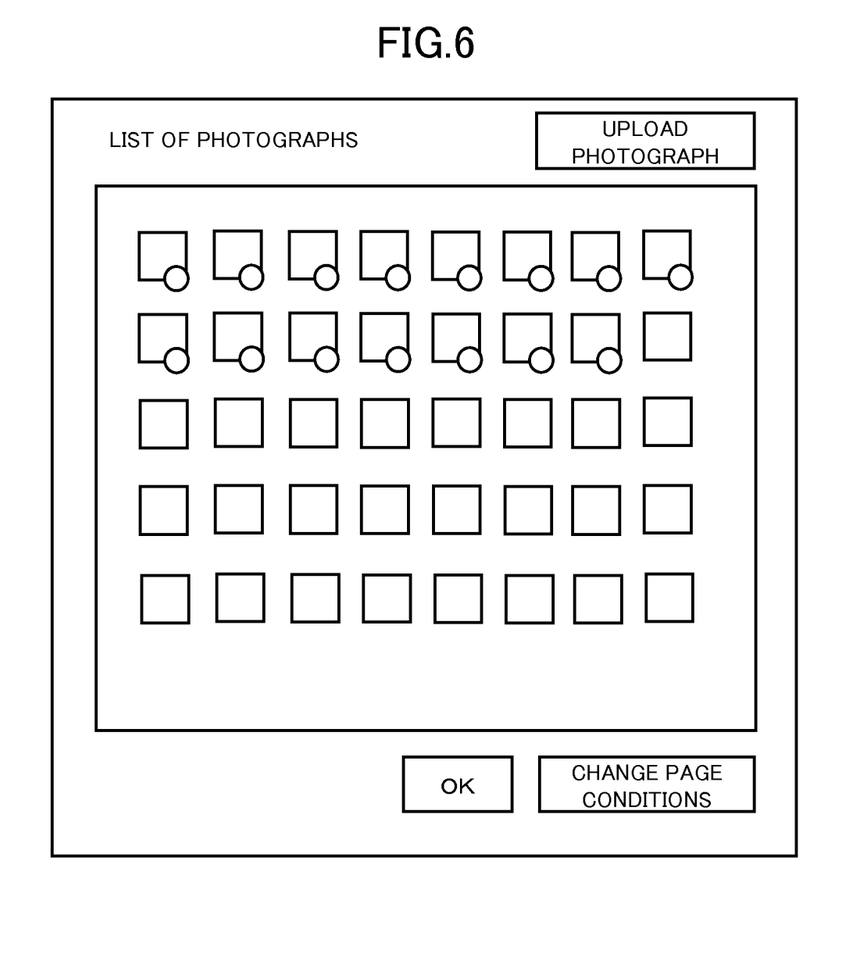
FIG. 6 A diagram illustrating an example of a screen showing images to be used for a photo book.

The image count determination section 41 next calculates the number of images that can always be assigned by the page assignment section 43 while satisfying the input conditions (hereinafter referred to as "assignable number") (Step S102). FIG. 6 is a diagram illustrating an example of a screen showing the images to be used for the photo book. The image count determination section 41 displays on the client device 2 the screen showing the images to be used for the assignment based on the calculated number. In FIG. 6, a small rectangle represents an image of a photograph and a small rectangle having a circle placed in its lower right portion represents an image to be used for the assignment. In the examples illustrated in FIGS. 5 and 6, the maximum number of images per page is four, the number of pages is six, and the assignable number is fifteen. In the example of the screen of FIG. 6, only pieces of image data whose number corresponds to the assignable number are used for the assignment, and hence the circles are placed in the lower right portions of the images whose number is the same as the assignable number. When the user depresses an "OK" button on this screen, the processing flow proceeds to the processing in Step S103 and subsequent steps. The assignable number calculated in this case is determined based on an algorithm of the page assignment section 43. Therefore, details of this calculation method are described after the algorism of the page assignment section 43 is described. Note that, although not illustrated in the processing flow for a simple description, when the user depresses a "change page conditions" button, the screen returns to the screen of FIG. 5, and the processing flow is repeated from the processing in Step S102. In this manner, the user inputs the number of pages and the maximum number of images per page while checking the images to be assigned to each page of the photo book in an interactive manner. The screens illustrated in FIGS. 5 and 6 may be combined into one screen in order to further improve the convenience for the user's input. Note that, the images to be used for the assignment are uploaded from the client device 2 at a timing before the user performs an operation on the screen of FIG. 5, or at a timing when the user depresses an "upload photograph" button on the screen of FIG. 6, and the image data on the uploaded images is stored in the storage unit 12. Note that, the images may be uploaded and stored in the storage unit 12 in advance, and the client device 2 may access those stored images to generate the screen illustrated in FIG. 6.

The image data acquisition section 42 is implemented mainly by the CPU 11 and the storage unit 12. The image data acquisition section 42 acquires pieces of image data whose number corresponds to the calculated assignable number from the storage unit 12 (Step S103).

Figure 7:
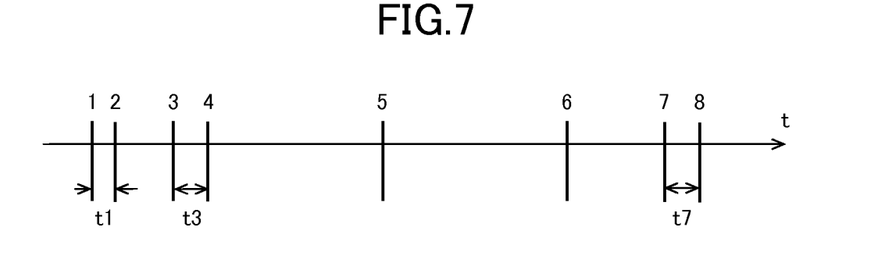
FIG. 7 A graph showing an example of a distribution of photographed times of respective pieces of image data.

FIG. 7 is a graph showing an example of a distribution of photographed times of respective pieces of image data. In FIG. 7, lines perpendicularly crossing a time axis correspond to the pieces of image data, and the positions of the lines on the time axis indicate the photographed times of the pieces of image data. It is assumed here that the pieces of image data are sorted and ordered in ascending order of the photographed times in advance. Note that, the pieces of image data may be sorted by the page assignment section 43 to be described later.

The page assignment section 43 is implemented mainly by the CPU 11 and the storage unit 12. Based on the photographed times of a plurality of pieces of image data and a given reference time interval, the page assignment section 43 determines the assignment of the pieces of image data to each page so that an interval between the photographed times of pieces of image data to be assigned to each page is the reference time interval or smaller. Further, the page assignment section 43 changes the given reference time interval, to thereby determine the assignment that satisfies at least a part of the conditions for the number of pages and the maximum number of pieces of image data to be assigned to each page (maximum number of images per page). A description is given below of a case where the page assignment section 43 determines the assignment that satisfies the conditions for the number of pages and the maximum number of images per page.

Figure 8:
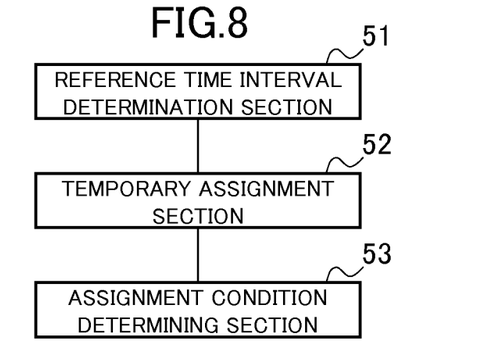
FIG. 8 A functional block diagram illustrating a functional configuration of the page assignment section illustrated in FIG. 3.

FIG. 8 is a functional block diagram illustrating a functional configuration of the page assignment section 43. The page assignment section 43 functionally includes a reference time interval determination section 51, a temporary assignment section 52, and an assignment condition determining section 53. The reference time interval determination section 51 determines a new given reference time interval. Based on the determined given reference time interval and the photographed times of the respective pieces of image data, the temporary assignment section 52 assigns a plurality of pieces of image data to each of a plurality of pages as a temporary assignment so that the interval between the photographed times of the pieces of image data to be assigned to each of the plurality of pages is the reference time interval or smaller and that the number of the pieces of image data to be assigned to each of the plurality of pages is the number corresponding to the condition for the maximum number or smaller. When the number of pages assigned by the temporary assignment section 52 satisfies the condition for the number of pages, the assignment condition determining section 53 determines the temporary assignment that is performed by the temporary assignment section 52 as the assignment of the pieces of image data to the plurality of pages.

More specific processing is described below. First, in order to initialize processing of assigning the pieces of image data to the pages, the temporary assignment section 52 assigns one piece of image data to one page as the temporary assignment (Step S104). The number of pages in the temporary assignment thus corresponds to the number of the pieces of image data. In this case, numbers (orders of page) obtained when those numbers are assigned from the first page are equal to numbers of the pieces of image data to be assigned, respectively.

Next, based on the maximum number of images per page and the photographed times of the pieces of image data to be assigned to the respective pages, the reference time interval determination section 51 determines the reference time interval so that the value of the reference time interval monotonously increases as the processing is repeated (Step S105). In the first time, the reference time interval determination section 51 determines, as the minimum reference time interval, the minimum one of the intervals of the photographed times between every adjacent pieces of image data. In the second and subsequent times, the reference time interval determination section 51 determines as the reference time interval the minimum one of the time intervals between every adjacent two pages that satisfy the following condition. This condition is a condition that a sum of the numbers of images assigned to adjacent pages is the maximum number of images per page or smaller. When this condition is satisfied, the time interval between adjacent pages is equal to or larger than the reference time interval that is determined the last time. In this case, the time interval between adjacent two pages is calculated by using the photographed times of the pieces of image data included in those pages. For example, the difference in photographed times between one of the pieces of image data that is included in one of the two pages and has the earliest photographed time and one of the pieces of image data that is included in the other of the two pages and has the earliest photographed time may be determined as the time interval between those two pages. Alternatively, the minimum one of the differences in photographed times between the respective pieces of image data included in one of the two pages and the respective pieces of image data included in the other of the two pages may be determined as the time interval between those two pages. Note that, when the reference time interval is to be determined, the time interval itself does not always need to be acquired as data. For example, selecting adjacent pages may also be equivalent to determining the time interval between the adjacent pages as the reference time interval.

Then, the reference time interval determination section 51 determines whether or not the reference time interval has been determined (Step S106). When the reference time interval is already sufficiently large and a new reference time interval cannot be determined ("N" in Step S106), finishing processing relating to the assignment is performed in Step S109 and subsequent processing.

When the reference time interval has been determined ("Y" in Step S106), the temporary assignment section 52 combines the images included in two pages having the determined reference time interval into one page (Step S107). It is to be understood that when the pages are combined, information indicating orders of the respective pages (for example, linked list of information on the respective pages) are rewritten so that the fact that pages are combined is reflected to the information. Two pages that satisfy the condition for the maximum number of images per page are substantially specified in the processing of the reference time interval determination section 51, and hence at the time of Step S107, the temporary assignment section 52 assigns the pieces of image data to the pages so as to satisfy the condition for the maximum number of images per page. Further, when the photographed times of adjacent pieces of image data in the combined page are considered, the interval between the photographed times of the pieces of image data that are newly adjacent to each other in the order of the photographed times is the time interval between the combined two pages or smaller. Therefore, in the temporary assignment at the time of the processing of the temporary assignment section 52 in Step S107, the time interval between ones of the pieces of image data assigned to each page that have the closest photographed times (that are adjacent to each other in the order of the photographed times) is always the reference time interval or smaller.

Next, the assignment condition determining section 53 determines whether or not the number of pages in the temporary assignment obtained as a result of the processing in Step S107 satisfies the condition for the number of pages acquired in Step S101 (Step S108), and when the condition is not satisfied ("N" in Step S108), the processing flow repeats the next loop from the processing in Step S105. When the condition for the number of pages is satisfied ("Y" in Step S108), the assignment condition determining section 53 determines information on the temporary assignment to the respective pages as an authorized assignment of the pieces of image data to the respective pages, and outputs details of the information to the storage unit 12 (Step S109).

Figure 9:
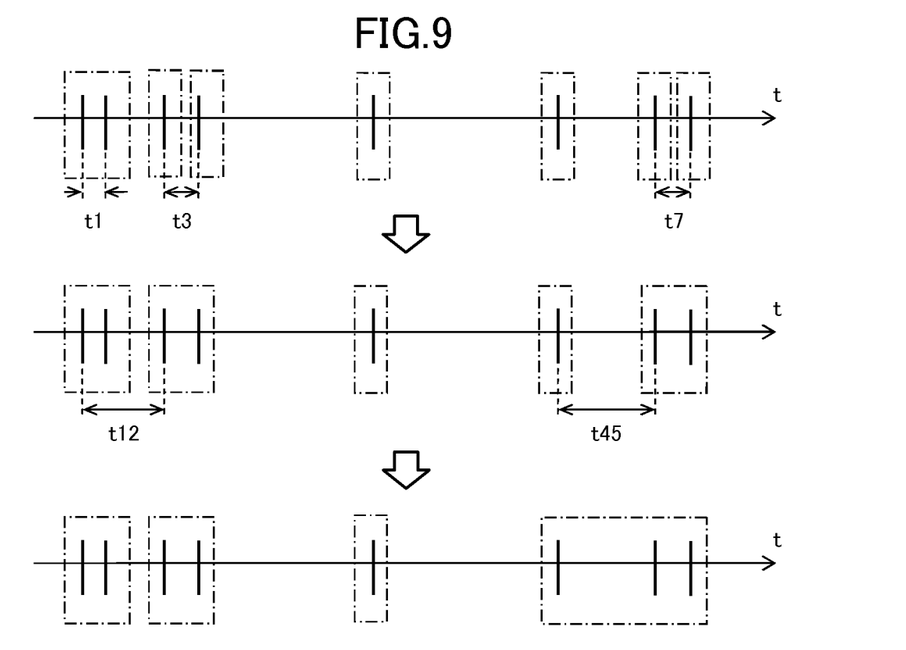
FIG. 9 A graph showing an example of a process of repeating a temporary assignment on the pieces of image data shown in FIG. 7.

FIG. 9 is a graph showing an example of a process of repeating the temporary assignment on the pieces of image data shown in FIG. 7. A description is now given of an example of a processing process on the assumption that the maximum number of images per page is three and the number of pages is four. A portion surrounded by the alternate long and short dash line of FIG. 9 represents one page and the line perpendicular to the time axis in the surrounded portion represents a piece of image data to be assigned to the page. When the intervals between the photographed times of the pieces of image data shown in FIG. 7 are examined, an interval t1 between the photographed times of a first piece of image data and a second piece of image data is the smallest, and the interval becomes larger in the order of an interval t3 between the photographed times of a third piece of image data and a fourth piece of image data and an interval t7 between the photographed times of a seventh piece of image data and an eighth piece of image data. In a first loop, the pages to which the first piece of image data and the second piece of image data that have the smallest time interval are respectively assigned by the processing of the page assignment section 43 are combined into one (upper part of FIG. 9). The number of pages is four or larger at this stage, and hence the processing in the next loop is continued. In the same manner, pages having the third piece of image data and the fourth piece of image data are next combined into one so that those pieces of image data are assigned to one page, and then the seventh piece of image data and the eighth piece of image data are assigned to one page (middle part of FIG. 9). Next, a time interval t12 between a first page and a second page is the smallest among the time intervals of every adjacent pages, but the sum of pieces of image data to be assigned to those pages is four and thus exceeds three, which is the maximum number of images per page. Therefore, a fourth page and a fifth page that have a time interval t45 that is the second smallest time interval between the pages are combined (lower part of FIG. 9). As a result, the number of pages becomes four and the loop is thus finished, and the assignment of the pieces of image data to the pages shown in the lower part of FIG. 9 is determined as the authorized assignment. Once a plurality of pieces of image data are combined (grouped) into one, a group of combined pieces of image data is not separated from then on.

As can be imagined from the processing process of FIG. 9, unless the processing in Step S102 is considered, there may occur a case where depending on the distribution of the photographed times of the pieces of image data, even when the number of images to be subjected to the assignment processing is the same, the pages are not sufficiently combined and the pieces of image data cannot be assigned so as to satisfy the conditions for the number of pages and the like. In such a case, specifically, it is difficult to newly determine an effective reference time interval, and the assignment is determined by the determination in Step S106 despite the fact that the condition for the number of pages is not satisfied.

Figure 10:
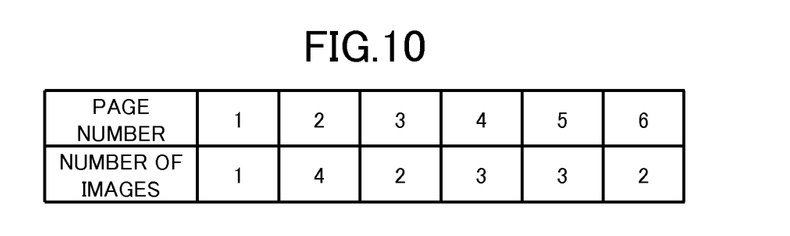
FIG. 10 A table showing an example of a distribution of the numbers of pieces of image data to be assigned to respective pages.

In order to avoid this problem, the image count determination section 41 calculates the maximum number of pieces of image data that are positively assigned by the page assignment section 43 to the pages whose number corresponds to the condition for the number of pages while satisfying the condition for the maximum number of images per page, irrespective of the type of distribution of the photographed times of the pieces of image data to be acquired. FIG. 10 is a table showing an example of the numbers of pieces of image data to be assigned to the respective pages. FIG. 10 shows an example of a case where the images whose number is the smallest are assigned to the respective pages and where the maximum number of images per page is four. As can be understood from FIG. 10, in the algorithm of the processing of the page assignment section 43, the pieces of image data are not assigned when the sum of the numbers of images to be assigned to adjacent pages exceeds the maximum number of images per page (four in the example of FIG. 10) even by one. In view of this, the image count determination section 41 calculates the number of pieces of image data (assignable number) W based on the following expression.

$$W=(Im+1)\times P/2$$

In this expression, Im represents the maximum number of images per page and P represents the number of pages. Note that, this expression is an expression given on the assumption that the number of pages is a multiple of two. For example, in a case where the photo book is created by printing every two facing pages, the number of pages is a multiple of two, and hence this expression can be used without any problem. Further, this expression may be expanded so that the expression is applicable to a case where the number of pages is an odd number. Note that, the maximum number of pieces of image data that are positively assigned by the page assignment section 43 to the pages whose number corresponds to the condition for the number of pages while satisfying the condition for the maximum number of images per page is, from another point of view, also the number of pieces of image data to be assigned by the page assignment section 43 while satisfying the condition for the maximum number of images per page so that regardless of the photographed times of the pieces of image data, the pieces of image data are assigned to all of the pages whose number corresponds to the condition for the number of pages. An association with possible combinations of the numbers of images to be assigned to the pages is now considered. When the number of images to be assigned to each of the pages whose number corresponds to the number of pages is represented by G(l) (where l represents a page number and an integer of one or larger and the number of pages or smaller), one of the combinations is represented by (G(1), G(2), . . . G(P)). Then, in general, there are a plurality of combinations that satisfy the condition that the sum of the numbers of pieces of image data to be assigned to adjacent pages is larger than the maximum number of images per page while satisfying the condition for the maximum number of images per page. Further, when the sum of the numbers of pieces of image data assigned to the respective pages is calculated for each combination that satisfies those conditions, the minimum value of the calculated sums is equivalent to the assignable number. In other words, from another point of view, the image count determination section 41 determines the minimum value of the sums of the numbers of pieces of image data assigned to the respective pages constituting the combinations that satisfy the above-mentioned conditions.

Note that, instead of using the image count determination section 41 to restrict the number of pieces of image data to be acquired by the image data acquisition section 42, a function of (page count reduction section for) performing processing of reducing the number of pages may be added, to thereby satisfy the condition for the number of pages by using another method in a case where the pieces of image data cannot be assigned so as to satisfy the condition for the number of pages. Specifically, based on the assignment to the respective pages that is output in Step S109 in the above-mentioned case, the page count reduction section may extract a combination of pages that exist between two pages that are not adjacent to each other in which the sum of the numbers of pieces of image data included in those pages is the maximum number of images per page or smaller, and combine the combination of pages. Further, in order to reduce the number of pages more positively, the page count reduction section may select, of the pages whose number of assigned pieces of image data is smaller than the maximum number of images per page, a page that has the largest average of time intervals between every adjacent images assigned to the page, separate the page into a plurality of pages, and then extract and combine the possible combination of pages that exist between the above-mentioned two pages that are not adjacent to each other.

Figure 11:
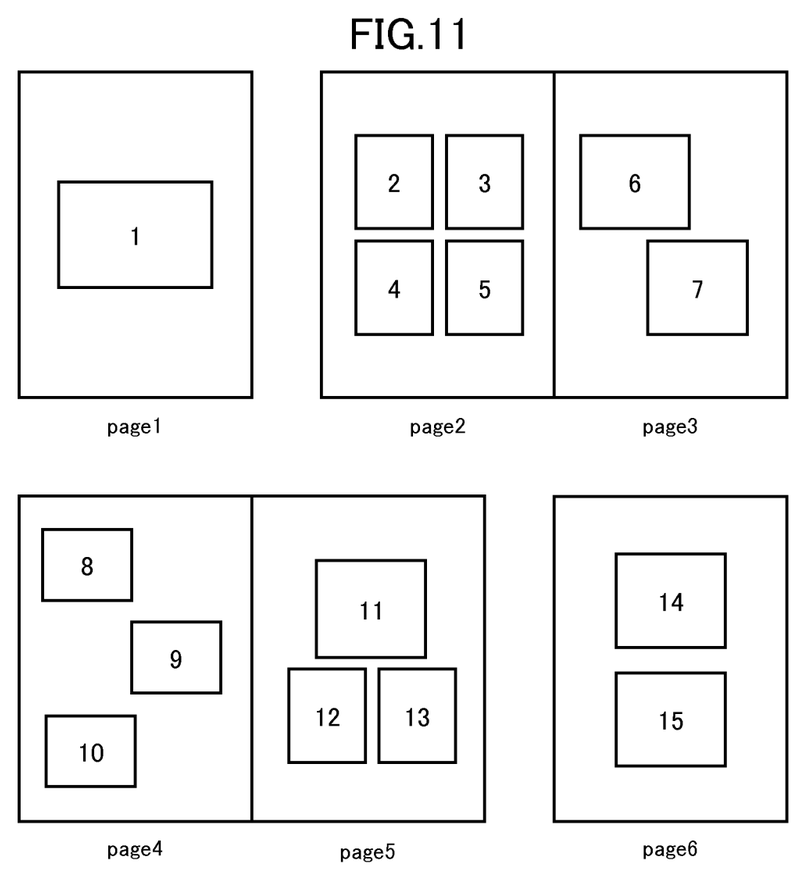
FIG. 11 A diagram illustrating an example of images of pages to which the images are assigned.

The page image output section 44 is implemented mainly by the CPU 11, the storage unit 12, and the communication unit 13. The page image output section 44 outputs respective pieces of image output data on a plurality of pages based on a result of the assignment performed by the page assignment section 43. In the storage unit 12, one or a plurality of pieces of layout information indicating a page layout including the position and size of an image to be assigned and a background graphic are stored in advance for each number of images to be assigned. The page image output section 44 acquires from the storage unit 12 one of the pieces of layout information that are prepared in association with the respective numbers of images to be assigned to the pages, and assigns an image indicated by the image data assigned to the page to a layout based on the arrangement of the image indicated by the acquired piece of layout information, to thereby generate the image of the page. The generated pieces of image output data on the images of the respective pages are output to the client device 2, and the images of the respective pages are displayed on the screen of the client device 2. Further, when the assignment of each page does not need to be changed, the image output data for printing is transmitted to the printing system 3. FIG. 11 is a diagram illustrating an example of the images of the pages to which the images are assigned. A rectangle having a number assigned thereto represents the assigned image such as a photograph, and the number represents a number of the image that is sorted in the order of the photographed time.

Note that, the user may correct the assignment of images to the respective displayed pages in an interactive manner. Images that have the photographed times close to one another and thus have a high probability of being highly relevant to one another are assigned to the same page by the processing of the page assignment section 43 and the like, and the maximum number of images per page and the like are taken into consideration, and hence even when the user corrects the assignment, the operation amount is expected to be smaller than in a case where the user assigns the images from the beginning.

[Second Embodiment]

A description is given below of a second embodiment of the present invention by focusing mainly on differences from the first embodiment. The second embodiment is the same as the first embodiment in that the photo book editing system includes the image editing server 1 and the client device 2 and in the hardware configuration of the image editing server 1.

Figure 12:
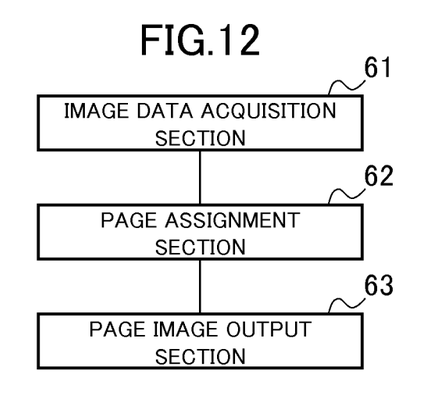
FIG. 12 A functional block diagram illustrating functions implemented by an image editing server according to a second embodiment.

FIG. 12 is a functional block diagram illustrating functions implemented by the image editing server 1 according to the second embodiment. The image editing server 1 functionally includes an image data acquisition section 61, a page assignment section 62, and a page image output section 63. Those functions are implemented by the CPU 11 executing the program stored in the storage unit 12 to control the communication unit 13 and the input/output unit 14.

Figure 13:
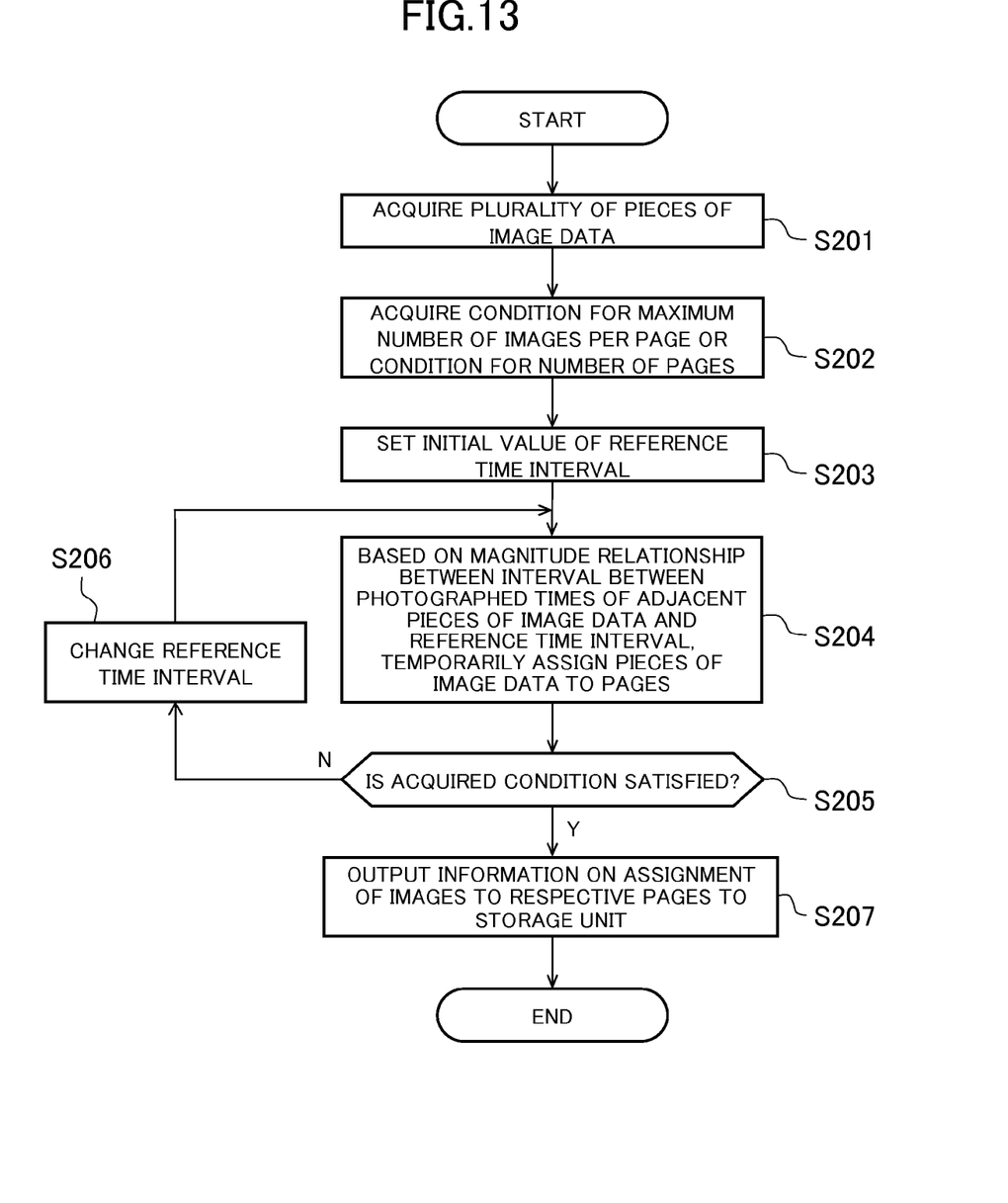
FIG. 13 A diagram illustrating an example of a processing flow of an image data acquisition section and a page assignment section according to the second embodiment.

The functions of the image data acquisition section 61 and the page assignment section 62 are described below with reference to a processing flow. FIG. 13 is a diagram illustrating an example of the processing flow of the image data acquisition section 61 and the page assignment section 62 according to the second embodiment.

The image data acquisition section 61 is implemented mainly by the CPU 11, the storage unit 12, and the communication unit 13. The image data acquisition section 61 acquires a plurality of pieces of image data (Step S201). The image data acquisition section 61 acquires from the storage unit 12 and the like, for example, a plurality of pieces of image data that are uploaded by the user in advance via the client device 2 and the network and that the user determines to use for creation of the photo book.

The page assignment section 62 is implemented mainly by the CPU 11 and the storage unit 12. Based on the photographed times of a plurality of pieces of image data and a given reference time interval, the page assignment section 62 determines the assignment of the pieces of image data to each page so that an interval between the photographed times of pieces of image data to be assigned to each page is the reference time interval or smaller. Further, the page assignment section 62 changes the given reference time interval, to thereby determine the assignment that satisfies at least a part of the conditions for the number of pages and the maximum number of pieces of image data to be assigned to each page (maximum number of images per page).

Figure 14:
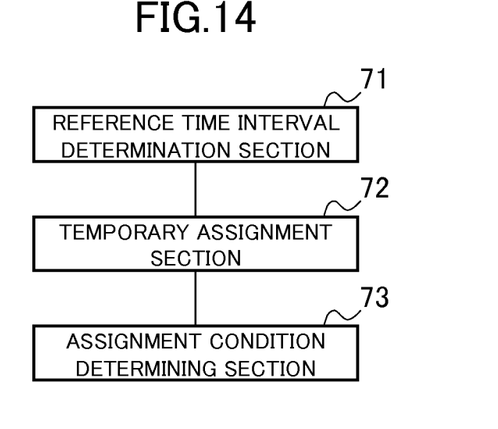
FIG. 14 A functional block diagram illustrating a functional configuration of the page assignment section illustrated in FIG. 12.

FIG. 14 is a functional block diagram illustrating a functional configuration of the page assignment section 62. The page assignment section 62 functionally includes a reference time interval determination section 71, a temporary assignment section 72, and an assignment condition determining section 73. The reference time interval determination section 71 determines a new given reference time interval. Based on the determined given reference time interval and the photographed times of the respective pieces of image data, the temporary assignment section 72 assigns a plurality of pieces of image data to each of a plurality of pages as a temporary assignment so that the interval between the photographed times of the pieces of image data to be assigned to each of the plurality of pages is the reference time interval or smaller and that the number of the pieces of image data to be assigned to each of the plurality of pages is the number corresponding to the condition for the maximum number or smaller. When the number of pages assigned by the temporary assignment section 72 satisfies the condition for the number of pages, the assignment condition determining section 73 determines the temporary assignment that is performed by the temporary assignment section 72 as the assignment of the pieces of image data to the plurality of pages.

More specific processing is described below. First, the page assignment section 62 acquires the condition for the maximum number of images per page or the condition for the number of pages (Step S202). For example, the page assignment section 62 may acquire one of those conditions by using the screen such as the one illustrated in FIG. 5.

Next, the reference time interval determination section 71 sets an initial value of the reference time interval (Step S203). In this case, when the condition for the number of pages is to be used, the initial value of the reference time interval may be the minimum unit of the photographed time of the image data (for example, one second), or may be the minimum value of the intervals between the photographed times of adjacent pieces of image data. In addition, when the condition for the maximum number of images per page is to be used, the initial value of the reference time interval may be the maximum value of the intervals between the photographed times of adjacent pieces of image data.

Next, based on a magnitude relationship between the interval between the photographed times of adjacent pieces of image data and the reference time interval, the temporary assignment section 72 assigns the pieces of image data to the pages as the temporary assignment (Step S204). More specifically, the temporary assignment section 72 temporarily assigns the pieces of image data to the pages so that for the pieces of image data to be assigned to each page, the interval between the photographed times of adjacent pieces of image data is the reference time interval or smaller and that the interval between the photographed times of pieces of image data that are assigned to different pages and are adjacent to one another is larger than the reference time interval.

This processing for temporary assignment is performed through the following procedure, for example. First, in order from the first piece of image data, the temporary assignment section 72 determines whether or not the interval between the photographed times of a piece of image data and the next piece of image data in the order is larger than the reference time interval, and when the interval is larger than the reference time interval, the temporary assignment section 72 generates information indicating that there is a page boundary between those two pieces of image data. Next, after performing determination as to the above-mentioned page boundary on the interval between every adjacent pieces of image data, the temporary assignment section 72 performs processing of assigning the first piece of image data to a piece of image data that is placed immediately before a first page boundary to the first page, assigning a piece of image data that is placed immediately after a k-th page boundary (where k is an integer of one or larger and smaller than the number of page boundaries) to a piece of image data that is placed immediately before a (k+1)-th page boundary to a (k+1)-th page, and assigning a piece of image data that is placed immediately after the last page boundary to the last piece of image data to the last page. Through this processing, the assignment that satisfies the condition in Step S204 is performed.

Next, the assignment condition determining section 73 determines whether or not a result of the temporary assignment to the pages satisfies the condition acquired in Step S202 (Step S205). When the result does not satisfy the acquired condition ("N" in Step S202), the reference time interval determination section 71 changes the reference time interval (Step S206), and the processing in Step S204 and subsequent steps is repeated. In this case, when the number of pages is set as the condition, the reference time interval determination section 71 may increase the reference time interval by a given time, and when the maximum number of images per page is set as the condition, the reference time interval determination section 71 may decrease the reference time interval by a given time.

When the result satisfies the acquired condition ("Y" in Step S205), the assignment condition determining section 73 determines information on the temporary assignment to the respective pages as an authorized assignment of the pieces of image data to the respective pages, and outputs details of the information to the storage unit 12 (Step S207).

Figure 15:
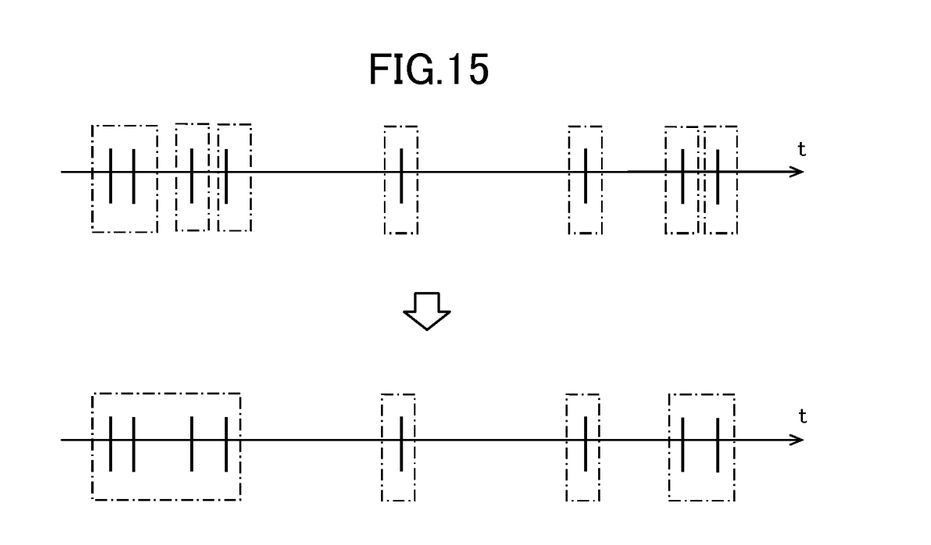
FIG. 15 A graph showing an example of a processing process performed when a condition for the number of pages is given.

FIG. 15 is a graph showing an example of a processing process performed when the condition for the number of pages is given. It is assumed that the photographed times of the pieces of image data are distributed as shown in FIG. 7, and that the number of acquired images is eight and the number of pages is four. In this case, the first piece of image data and the second piece of image data are assigned to one page in a first temporary assignment, and when the reference time interval becomes equal to or larger than the time interval between the second piece of image data and the third piece of image data, the pieces of image data are assigned to a total of four pages including a page having first to fourth images, a page having a fifth image, a page having a sixth image, and a page having seventh and eighth images. With this assignment, the assignment condition determining section 73 determines that the condition is satisfied, and outputs details of the assignment to the storage unit 12. As described above, the user may create the photo book within the range of the desired number of pages by giving only the condition for the number of pages. In this manner, the user may suppress an amount of money for the photo book within a budget and, at the same time, create the photo book on which all the desired images are printed.

Figure 16:
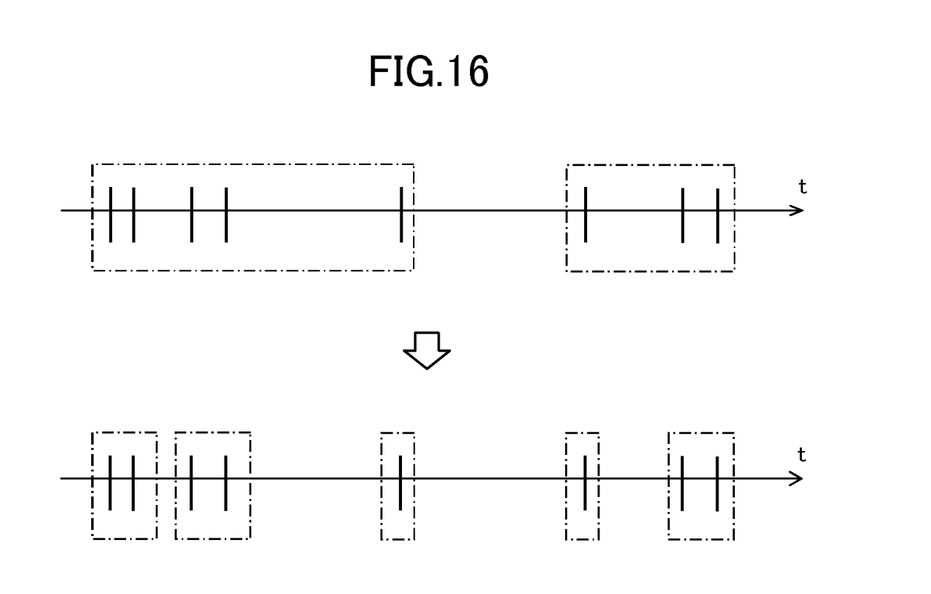
FIG. 16 A graph showing an example of a processing process performed when a condition for the maximum number of images per page is given.

FIG. 16 is a graph showing an example of a processing process performed when the condition for the maximum number of images per page is given. It is assumed that the photographed times of the pieces of image data are distributed as shown in FIG. 7, and that the number of acquired images is eight and the maximum number of images per page is three. In this case, in the first temporary assignment, five pieces of image data including the first to fifth pieces of image data are assigned to a first page and three pieces of image data including the sixth to eighth pieces of image data are assigned to a second page. When the loop is repeated several times, there is no longer a page to which the pieces of image data whose number exceeds the maximum number of images per page are assigned. With this assignment, the assignment condition determining section 73 determines that the condition is satisfied, and outputs details of the assignment to the storage unit 12. As described above, the user may create the photo book within the range of the desired number of printed images per page by giving only the condition for the maximum number of images per page. In this manner, the user may increase the size of each image and, at the same time, create the photo book on which all the desired images are printed.

Note that, the processing may be performed on the assumption that both the conditions for the maximum number of images per page and the number of pages may be given and that the number of pieces of image data to be assigned to each page may change. In this case, the processing in Steps S203 to S206 is the same as that performed when the condition for the maximum number of images per page is given. Then, when the condition for the maximum number of images per page is satisfied, the assignment condition determining section 73 outputs to the storage unit 12 information on pages including the first page to a page corresponding to the given number of pages and the pieces of image data to be assigned to those pages.

The processing performed by the page image output section 63 is the same as that performed by the page image output section 44 in the first embodiment, and hence a description thereof is omitted.

Note that, the pieces of image data to be used for an album may be changed in a repetitive and interactive manner by using an output result of the page image output section 63. For example, both the conditions for the maximum number of images per page and the number of pages are acquired in Step S202, and then the pieces of image data are assigned to the respective pages by the above-mentioned method. Then, when the number of assigned pages exceeds the number of pages of the photo book, in other words, the condition for the number of pages is not satisfied, the fact that the number of assigned pages exceeds the number of pages of the photo book is presented to the user via the client device 2. The user who has confirmed the fact may, for example, delete a piece of image data from the pieces of image data to be used for creating the photo book, or determine to use the pieces of image data that are already assigned to the pages whose number is indicated by the condition for the number of pages in order to create the photo book. When the user deletes the piece of image data, the image editing server 1 performs the processing in Steps S203 to S207 again, and presents to the user the respective pages to which the images are newly assigned. In this case, the number of pages is not always decreased, or the number of pages may be decreased further than expected by the user. However, it is possible to assign the images to the respective pages so as to satisfy the condition for the number of pages of the photo book and the condition for the maximum number of images per page by repeating the operation and processing described above.

While the photo book editing system is described above as an exemplary embodiment of the present invention, the present invention is not limited to the exemplary embodiment described above. For example, it is not always necessary that the data on the images of the respective pages be output to the printing system 3. This is because a compilation is not always a physical object such as the photo book and may be an object including electronic (virtual) pages. For example, the data on the images of the respective pages may be data to be displayed on a digital photo frame or a screen of a PC. Further, the image data to be assigned is not limited to a photograph of a still image, and for example, a moving image or a thumbnail of the moving image may be used for creating a menu screen of a DVD or the like.

The invention claimed is:

1. An image editing device, comprising:
an image data acquisition section for acquiring a plurality of pieces of image data;
a reference time interval determination section for determining a new reference time interval;
a temporary assignment section for determining, based on respective photographed times of the plurality of pieces of image data and the new reference time interval, a temporary assignment of the plurality of pieces of image data to each of a plurality of pages constituting a compilation so that an interval between photographed times of pieces of image data to be assigned to the each of the plurality of pages is the new reference time interval or smaller;
an assignment condition determining section for determining, when the temporary assignment satisfies at least one of a condition for a maximum number of pieces of image data to be assigned to the each of the plurality of pages and a condition for a number of pages of the plurality of pages, the temporary assignment of the plurality of pieces of image data to the each of the plurality of pages that is performed by the temporary assignment section as an assignment of the plurality of pieces of image data to the each of the plurality of pages; and
a page image output section for outputting image output data on the each of the plurality of pages based on the assignment.

2. The image editing device according to claim 1, wherein the assignment condition determining section determines the temporary assignment that satisfies the condition for the maximum number of pieces of image data to be assigned to the each of the plurality of pages and the condition for the number of pages of the plurality of pages.

3. The image editing device according to claim 2, further comprising an image data count calculation section for calculating a minimum value of a sum of numbers of pieces of image data of respective pages constituting, of possible combinations of numbers of images to be assigned to pages whose number corresponds to the condition for the number of pages, a combination that satisfies conditions that a number of pieces of image data to be assigned to each of the pages is the maximum number of pieces of image data to be assigned to the each of the plurality of pages or smaller and that a sum of numbers of pieces of image data to be assigned to adjacent pages is larger than the maximum number,
wherein the image data acquisition section acquires pieces of image data whose number corresponds to the calculated minimum value.

4. The image editing device according to claim 3, wherein the image data count calculation section calculates $(Im+1) \times P/2$ as the minimum value of the sum of the numbers of pieces of image data of the respective pages, where Im represents the maximum number of pieces of image data to be assigned to the each of the plurality of pages and P represents the number of pages of the plurality of pages.

5. The image editing device according to claim 1, wherein the page assignment section comprises:
the reference time interval determination section determines a new reference time interval;
the temporary assignment section assigns, based on the determined new reference time interval and the photographed times of the plurality of pieces of image data, the plurality of pieces of image data to the each of the plurality of pages so that the interval between the photographed times of the pieces of image data to be assigned to the each of the plurality of pages is the new reference time interval or smaller and that a number of pieces of image data to be assigned to the each of the plurality of pages is a number that corresponds to the condition for the maximum number or smaller; and
the assignment condition determining section determines, when a number of pages obtained by the assignment that is performed by the temporary assignment section satisfies the condition for the number of pages, the assignment of the plurality of pieces of image data to the each of the plurality of pages that is performed by the temporary assignment section as the assignment of the plurality of pieces of image data to the each of the plurality of pages.

6. An image editing method, comprising:
an image data acquisition step of acquiring a plurality of pieces of image data;
a reference time interval determination step of determining a new reference time interval;
a temporary assignment step of determining, based on respective photographed times of the plurality of pieces of image data and the new reference time interval, a temporary assignment of the plurality of pieces of image data to each of a plurality of pages constituting a compilation so that an interval between photographed times of pieces of image data to be assigned to the each of the plurality of pages is the new reference time interval or smaller;

an assignment condition determining step for determining, when the temporary assignment satisfies at least one of a condition for a maximum number of pieces of image data to be assigned to the each of the plurality of pages and a condition for a number of pages of the plurality of pages, the temporary assignment of the plurality of pieces of image data to the each of the plurality of pages that is performed by the temporary assignment step as an assignment of the plurality of pieces of image data to the each of the plurality of pages; and a page image output step of outputting image output data on the each of the plurality of pages based on the assignment.

7. A non-transitory computer readable storage medium having recorded thereon a program for causing a computer to execute the processing of:

acquiring a plurality of pieces of image data;

determining a new reference time interval;

determining, based on respective photographed times of the plurality of pieces of image data and the new reference time interval, a temporary assignment of the plurality of pieces of image data to each of a plurality of pages constituting a compilation so that an interval between photographed times of pieces of image data to be assigned to the each of the plurality of pages is the new reference time interval or smaller;

determining, when the temporary assignment satisfies at least one of a condition for a maximum number of pieces of image data to be assigned to the each of the plurality of pages and a condition for a number of pages of the plurality of pages, the temporary assignment of the plurality of pieces of image data to the each of the plurality of pages as an assignment of the plurality of pieces of image data to the each of the plurality of pages; and outputting image output data on the each of the plurality of pages based on the assignment.

* * * * *